United States Patent Office 2,729,200
Patented Jan. 3, 1956

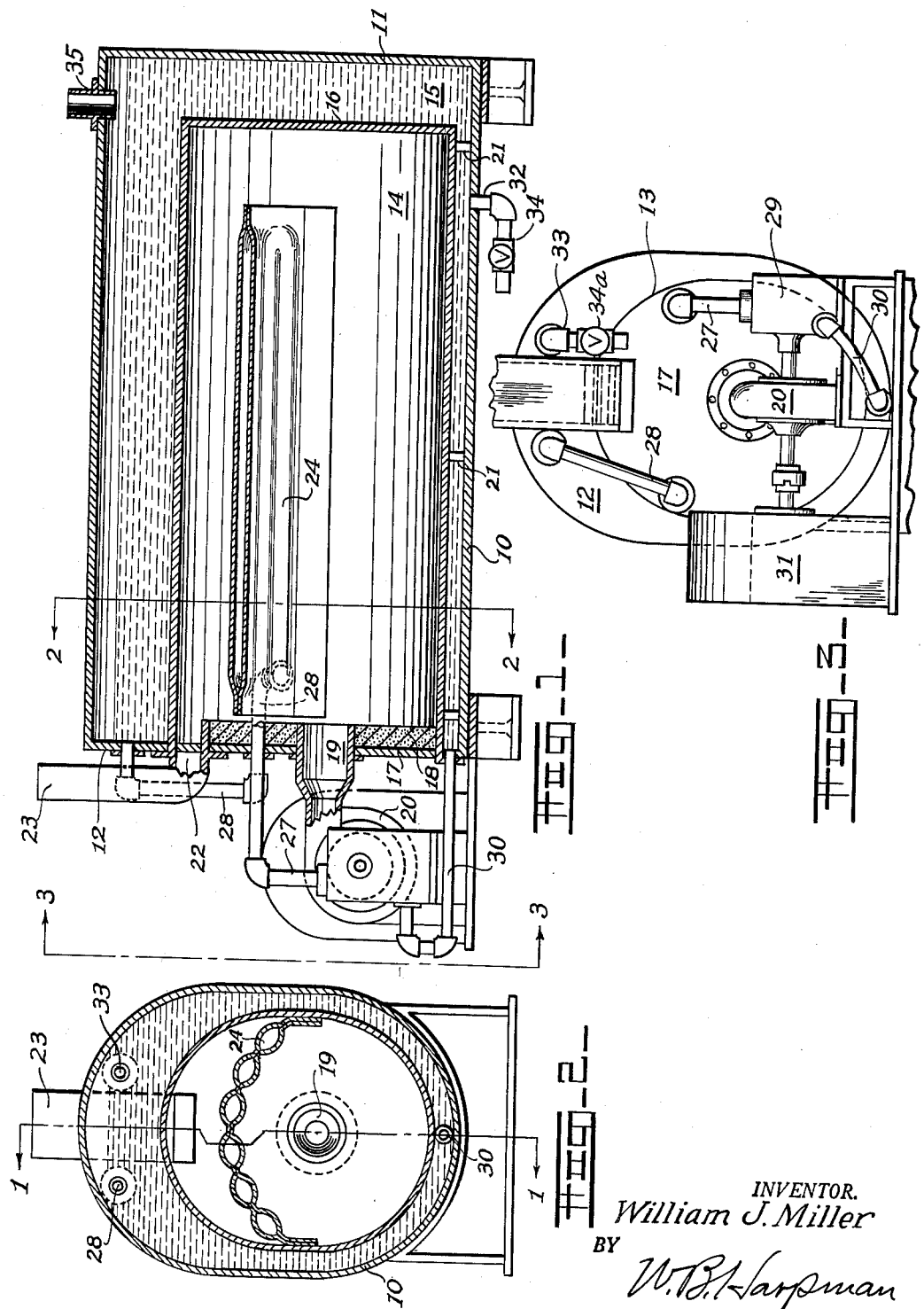

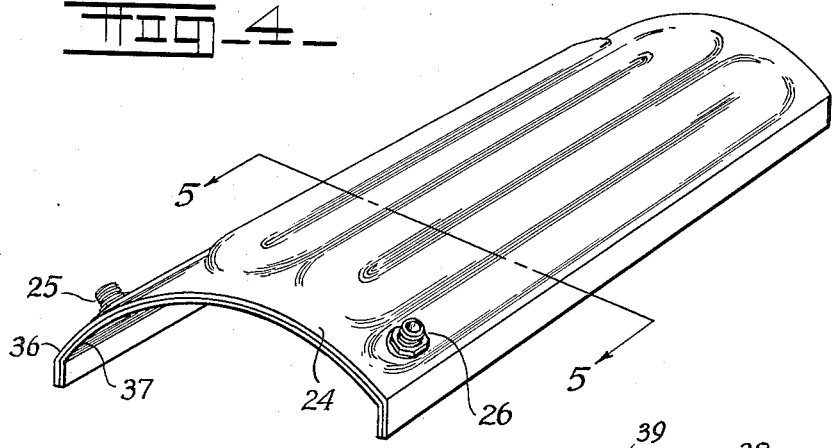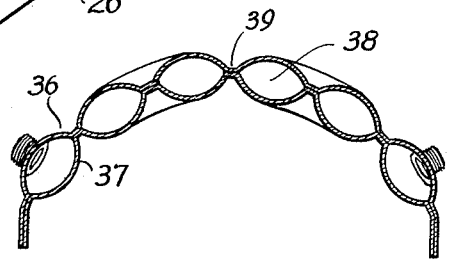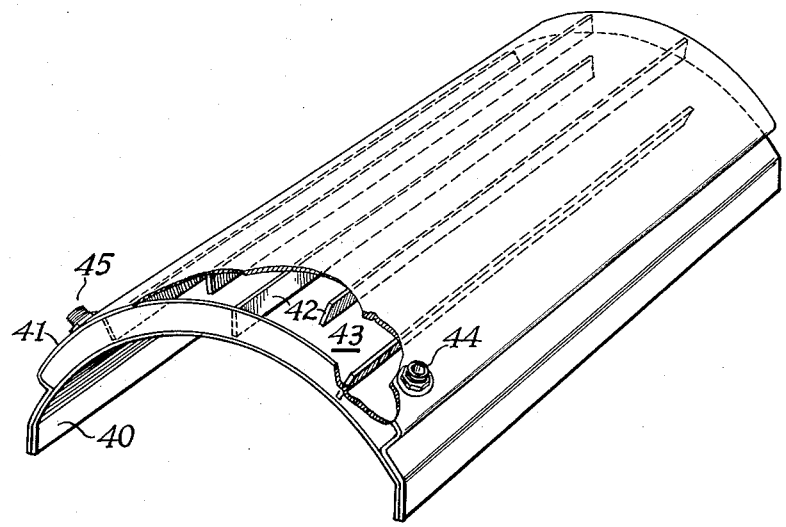

2,729,200
LIQUID HEATER
William Joseph Miller, Youngstown, Ohio

Application May 19, 1952, Serial No. 288,608

2 Claims. (Cl. 122—140)

This invention relates to a fluid heater and more particularly to a heater for achieving and maintaining desirable operating temperatures in a fluid such as a heating oil used for heating asphalt storing and processing tanks and the like.

The principal object of the invention is the provision of a liquid heater incorporating a novel combination baffle and heat exchange element greatly increasing the efficiency of the fluid heater.

A further object of the invention is the provision of a liquid heater of a simple and economic construction and having a fast heat loss recovery.

A still further object of the invention is the provision of a liquid heater devised to present a multiplicity of heat transfer surfaces to the heating means employed.

The liquid heater shown herein comprises an improvement over that shown in my Patent No. 2,503,883, issued April 11, 1950, and in my co-pending applications Serial No. 156,060, filed April 15, 1950, now Patent No. 2,613,665, and Serial No. 195,564, filed November 14, 1950, now Patent No. 2,363,490, and wherein the general problem of devising an efficient liquid heater for heating oils and the like used in heating bituminous materials are disclosed.

In the commercial construction and use of the various liquid heaters shown in the said patent and copending patent applications, certain knowledge has been gained relating to the relative efficiency of the various types of apparatus and indicating the desirability of achieving improved baffling of the heating means employed together with an improved heat transfer.

The present invention accordingly relates primarily to a liquid heater having a novel combination baffle and heat exchange element which enables the heater to meet the several objects of the invention.

The liquid heater disclosed herein is intended primarily in use for generating desirable operating temperatures in oil which is circulated from the heater to various remote points including heat exchange coils in tank cars in which bituminous products are shipped, heat exchange coils in storage tanks in which bituminous products are store and processing equipment used in handling bituminous materials such as asphalt and the like.

The present apparatus is particularly useful in connection with asphalt storage plants and those wherein the so-called hot mix paving materials are prepared and which are generally referred to as asphaltic concrete, etc. In such plants the problem of maintaining the asphalt and/or other bituminous materials in a suitable liquid state has long existed and the liquid heater disclosed herein meets the problem with exceptional efficiency and low operating cost.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a vertical section of the liquid heater.

Figure 2 is a cross section taken on line 2—2 of Figure 1.

Figure 3 is a front elevation taken on line 3—3 of Figure 1.

Figure 4 is an enlarged perspective view of a combined baffle and heat exchange unit forming a part of the liquid heater shown in Figures 1 and 2.

Figure 5 is a cross section taken on line 5—5 of Figure 4.

Figure 6 is a perspective view of a modified form of combination baffle and liquid heater.

By referring to the drawings and Figures 1, 2 and 3 in particular, it will be seen that a liquid heater is disclosed which comprises an elongated oval tank 10 having a rear end wall 11 and a front end wall 12. A relatively large opening 13 is formed in the front end wall 12 and a casing 14 is positioned within the opening 13 in the end wall 12 and within the tank 10. The casing 14 is of relatively smaller size than the tank 10 so that a liquid chamber 15 is formed thereabout including the area between an end wall 16 of the casing 14 and the rear end wall 11 of the tank 10. A front wall 17 is provided for the casing 14 and is lined with suitable refractory material 18. The front wall 17 and the material 18 have an orifice therein in which a nozzle 19 is positioned and through which products of combustion are adapted to be directed by an oil burner 20. The casing 14 is supported on a plurality of supports 21 so that a heat transfer liquid medium such as oil may be positioned completely thereabout in the chamber 15.

The front wall 17 of the casing 14 is provided with a secondary orifice 22 to which a stack 23 is secured and a transversely positioned longitudinally extending combination baffle and heat exchanger 24 is positioned in the casing 14 transversely thereof above the nozzle 19 and below the outlet orifice 22. As may best be seen by referring to Figure 2 of the drawings, the combination baffle and heat exchanger 24 extends from a point immediately adjacent the refractory material 18 of the front wall 17 of the casing 14 to a point inwardly from the rear wall 16 thereof. Thus, products of combustion introduced into the casing 14 by the oil burner 20 and through the nozzle 19 will enter the area of the casing 14 beneath the combination baffle and heat exchanger 24 and will be directed rearwardly toward the end wall 16 whereupon they may pass upwardly and reverse their course flowing along the upper surface of the combination baffle and heat exchanger 24 to the outlet orifice 22 and to the stack 23.

As illustrated in Figures 1, 2, 4 and 5 of the drawings, the combination baffle and heat exchanger 24 comprises a pair of suitable metal plates which have been seam welded to one another adjacent their peripheral edges and provided with longitudinally extending welded seams intermediate the side edges thereof and which longitudinally extending welded seams terminate alternately inwardly from the front and back edges of the combination baffle and heat exchanger 24 so that a tortuous passageway is formed therebetween when the sheets are separated between the welded seams as through the use of hydraulic pressure introduced therebetween. The heat exchanger may thus be formed to conform to any desired size and shape and lends itself particularly well to installation in the casing 14, as best shown in Figure 2 of the drawings.

The combination baffle and heat exchanger 24 is provided with outlets 25 and 26, as best shown in Figure 4 of the drawings, and to which pipes 27 and 28 are connected. The pipes 27 and 28 communicate respectively with a pump 29 and the chamber 15 in the tank 10. A third pipe 30 connects the inlet of the pump 29 with the lowermost point of the chamber 15 in the tank 10 so that when the pump 29 is operated, liquid from the lowest point in the chamber 15 of the tank 10 is continually circulated through the combination baffle and heat exchanger 24 and delivered in a super-heated state to the uppermost point of the chamber 15. Alternately, the circulation may be reversed if desired. The pump 29 is preferably but not necessarily driven by a motor generally indicated by the numeral 31 and which motor also drives the oil burner 20 heretofore referred to.

The tank 10 is provided with an inlet fitting 32 and an outlet fitting 33, both of which are controlled by valves 34 and 34a, respectively, and by means of which remote heat exchangers such as coils in an asphalt storage tank may be placed in communication with the liquid heater. It will be understood by those skilled in the art that separate circulating pumps are employed to circulate the liquid heating medium from the chamber 15 to and from such remote points. The tank 10 is also provided with a venting orifice 35 located on its uppermost surface which is open to atmosphere as the system operates at atmospheric pressures.

By referring now to Figures 4 and 5 of the drawings it will be seen that the combination baffle and heat exchanger 24 is formed of a pair of superimposed sheets or plates 36 and 37 welded to one another by continuous seams, as heretofore disclosed, so that when they are separated from one another by introduction of suitable hydraulic pressures therebetween, a continuously connected passageway for the liquid heating medium is formed. The passageway is generally indicated by the numeral 38 and it will be observed that the longitudinal seams between the several longitudinally extending portions of the passageway 38 are indicated by the numeral 39 and that they extend alternately to the opposite ends of the device.

In Figure 6 of the drawings a combination baffle and heat exchanger of a modified construction is disclosed and it will be seen to comprise a plate 40 having a secondary plate 41 positioned in spaced relation thereto, the ends and sides thereof being secured to the plate 40 as by welding and a plurality of longitudinally extending baffles 42 are positioned between the plates 40 and 41 to form a tortuous passageway 43 between the plates 40 and 41.

Inlet and outlet orifices 44 and 45 are positioned in the plate 41 and communicate with the opposite ends of the tortuous passageway or chamber 43 and it will occur to those skilled in the art that the modification of Figure 6 may be used with equal efficiency in the liquid heater shown in Figure 1 of the drawings.

It will thus be seen that the liquid heater disclosed herein meets the several objects of the invention and those skilled in the art will recognize that an unusually efficient heat transferring action may be obtained by the combined baffle and heat exchanger construction which is positioned almost entirely in the path of the products of combustion introduced into the heater.

Having thus described my invention, what I claim is:

1. An apparatus for storing and heating a heat transfer liquid comprising a horizontally disposed liquid holding tank having side walls and top and bottom walls and front and rear end walls, a casing extending horizontally into said tank through an opening in the front wall thereof and disposed in spaced relation to the top and the bottom and the side walls and having a rear end wall spaced from the rear wall of the tank and thereby providing a liquid chamber in the tank about the casing, there being a vent opening through the top of the tank, a closure for the front end of said casing, said casing defining a combustion chamber, a baffle extending longitudinally in said combustion chamber in spaced relation to the top and bottom and at its inner rear end being spaced from said casing rear end wall, said baffle being arched transversely and having depending side flanges secured tightly against inner surfaces of side walls of the casing and dividing the combustion chamber into a main portion under the baffle and an outlet portion above the baffle communicating with the main portion through space between the rear end of the baffle and the rear end wall of the casing, said baffle being hollow and having upper and lower walls consisting of metal plates secured in face to face engagement with each other along side edge portions to form the depending side flanges of double thickness, the upper and lower plates being also welded to each other along line spaced from each other transversely of the baffle and between the lines of welding being crimped and thereby defining a tortuous path extending back and forth through the baffle longitudinally thereof and having an inlet at one end and an outlet at its other end, a platform in front of said tank, a pump on said platform having an inlet pipe communicating with the front end of the liquid chamber under said casing and an outlet pipe communicating with the inlet end of said tortuous path, a pipe extending between the outlet end of the tortuous path and the front end of the liquid chamber above said casing, a blower-type burner on said platform having a discharge nozzle passing through the closure for the front end of said combustion chamber under said baffle, a motor on said platform driving the pump and the burner, and an outlet stack communicating with the front end of the combustion chamber above the baffle.

2. An apparatus for storing and heating a heat transfer liquid comprising a horizontally disposed liquid holding tank having side walls and top and bottom walls and front and rear end walls, a casing extending horizontally into said tank through an opening in the front wall thereof and disposed in spaced relation to the top and the bottom and the side walls and having a rear end wall spaced from the rear wall of the tank and thereby providing a liquid chamber in the tank about the casing, there being a vent opening through the top of the tank, a closure for the front end of said casing, said casing defining a combustion chamber, a baffle extending longitudinally in said combustion chamber in spaced relation to the top and bottom and at its inner rear end being spaced from said casing rear end wall, said baffle being arched transversely and having depending side flanges secured tightly against inner surfaces of side walls of the casing and dividing the combustion chamber into a main portion under the baffle and an outlet portion above the baffle communicating with the main portion through space between the rear end of the baffle and the rear end wall of the casing, said baffle being hollow and having upper and lower walls consisting of metal plates secured in face to face engagement with each other along side edge portions to form the depending side flanges of double thickness, the upper and lower plates being also welded to each other along lines spaced from each other transversely of the baffle and between the lines of welding being crimped and thereby defining a tortuous path extending back and forth through the baffle longitudinally thereof and having an inlet at one end and an outlet at its other end, a pump having an inlet pipe communicating with the front end of the liquid chamber under said casing and an outlet pipe communicating with the inlet end of said tortuous path, a pipe extending between the outlet end of the tortuous path and the front end of the liquid chamber above said casing, a blower type burner having a discharge nozzle passing through the closure for the front end of said combustion chamber under said baffle, a motor driving the pump and the burner, and an outlet stack communicating with the front end of the combustion chamber above the baffle.

References Cited in the file of this patent

UNITED STATES PATENTS

| | | |
|---|---|---|
| 604,052 | King | May 17, 1898 |
| 795,948 | Voelpel et al. | Aug. 1, 1905 |
| 1,057,566 | Marsh et al. | Apr. 1, 1913 |
| 1,180,078 | Rochelle | Apr. 18, 1916 |
| 1,265,171 | Bynum | May 7, 1918 |
| 2,020,221 | Sturgis | Nov. 5, 1935 |
| 2,055,949 | Sharp | Sept. 29, 1936 |
| 2,141,238 | Daly | Dec. 27, 1938 |

FOREIGN PATENTS

| | | |
|---|---|---|
| 366,783 | Great Britain | Feb. 11, 1932 |
| 377,835 | Great Britain | Aug. 4, 1932 |
| 399,334 | Great Britain | Oct. 5, 1933 |